Feb. 2, 1965    R. C. CROSS    3,168,122
FILLER
Filed Jan. 3, 1962    3 Sheets-Sheet 1

INVENTOR.
Ralph C. Cross
BY
Townsend and Townsend
attorney

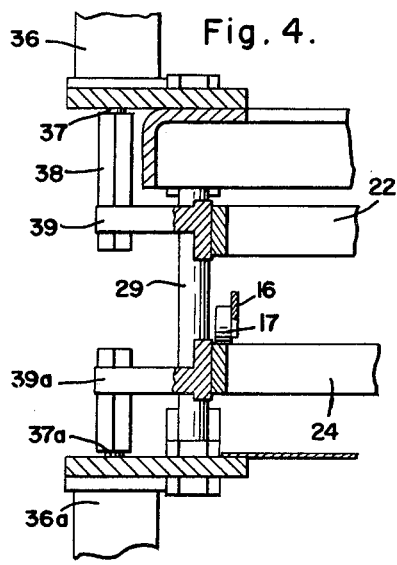
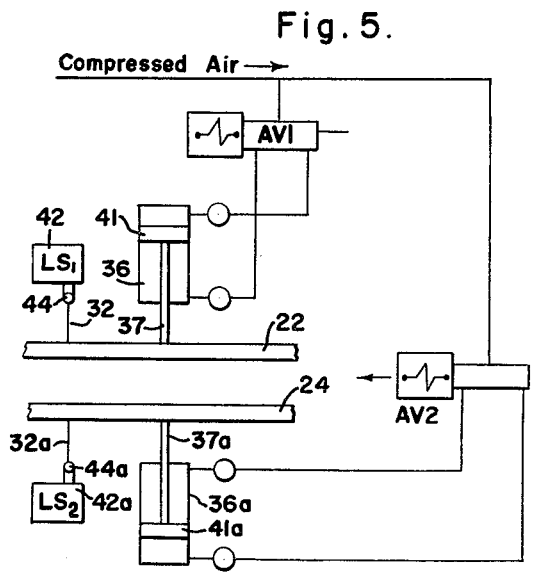
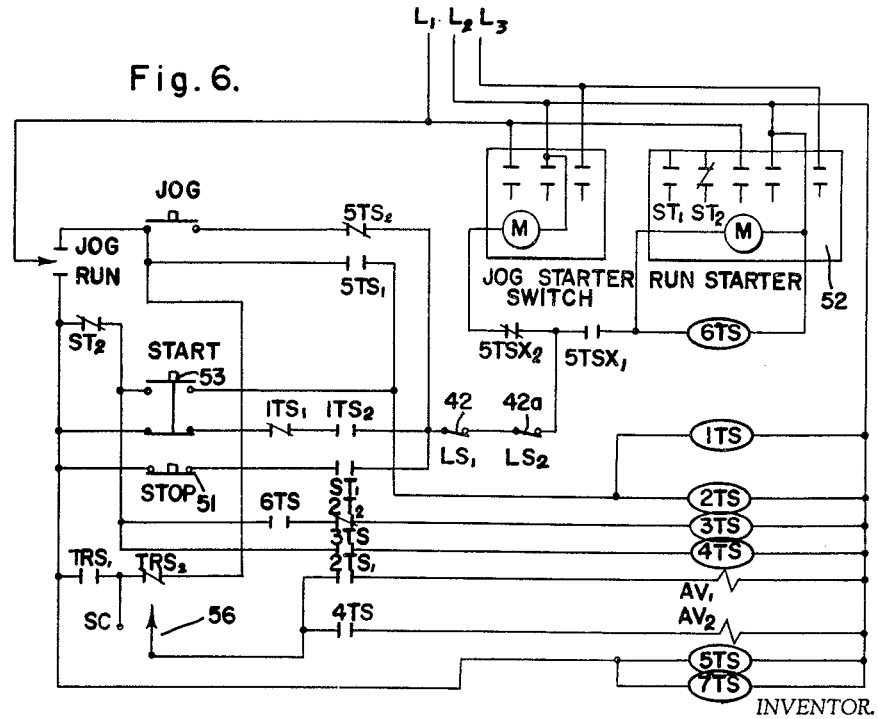

United States Patent Office  3,168,122
Patented Feb. 2, 1965

3,168,122
FILLER
Ralph C. Cross, Rochester, N.Y., assignor to Gerber Products Company, Fremont, Mich., a corporation of Michigan
Filed Jan. 3, 1962, Ser. No. 164,082
12 Claims. (Cl. 141—147)

This invention relates to a new device for actuating container filler valves. A common type of filler for glass jars and cans comprises a rotating turret having multiple pockets into which containers are inserted at the loading station of the cycle of rotation by a star wheel or other well known container feeding device, carried around the turret and discharged at a discharge station and transferred to a capping or closing machine. The liquid, puree, or similar product is deposited in a bowl having discharge passageways terminating in filling spouts corresponding in number and position to the pockets of the turret, each passageway having a valve which opens at a precise point in the path of travel of the turret and closes at a later point, the angular or circumferential distance between the points of opening and closing of the valve being such that the valve is open for a precise time interval to fill the container to a predetermined level. The present invention constitutes an improvement upon such filler machines.

One of the problems encountered in the operation of container fillers of the type heretofore described arises out of the fact that for various reasons it is necessary from time to time to stop and start the filler machine and this interferes with proper filling. In normal operation the valve cylinder is not completely emptied. If the valve remains open, the entire contents of the valve cylinder discharge by gravity thereby overfilling the container. Overfilling causes several undesirable results, among which are the following:

One result of overfilling the container is the wastage of the material being filled into the containers, which in the case of certain type of products has considerable economic value.

A still further undesirable result of overfilling is the fact that leakage causes the contents to run over portions of the machine which may cause sticking of movable parts, corrosion, and other maintenance problems.

A still further undesirable result of overfilling is interference with the capping of the container. A precise headspace is desirable in the container prior to the capping operation. If a cap is applied to a container filled higher than the capacity for which the container and cover were designed, proper fitting of the cap on the container may be prevented. Accordingly, a principal feature and advantage of the present invention is the elimination of undesirable results from overfilling containers which occurs when the filler valve is opened greater than normal times occasioned by the stopping of the filling machines while containers are pocketed in the turret thereof.

Other objects of the present invention will become apparent upon reading the following specification and referring to the accompanying drawings in which similar characters of reference represent corresponding parts in each of the several views.

In the drawings:

FIG. 4 is a fragmentary vertical sectional view taken substantially along the line 4—4 of FIG. 1.

FIG. 5 is a schematic view showing the compressed air circuit of the machine and a portion of the electrical controls therefor.

FIG. 6 is a wiring diagram of the electrical system.

Figure 1:
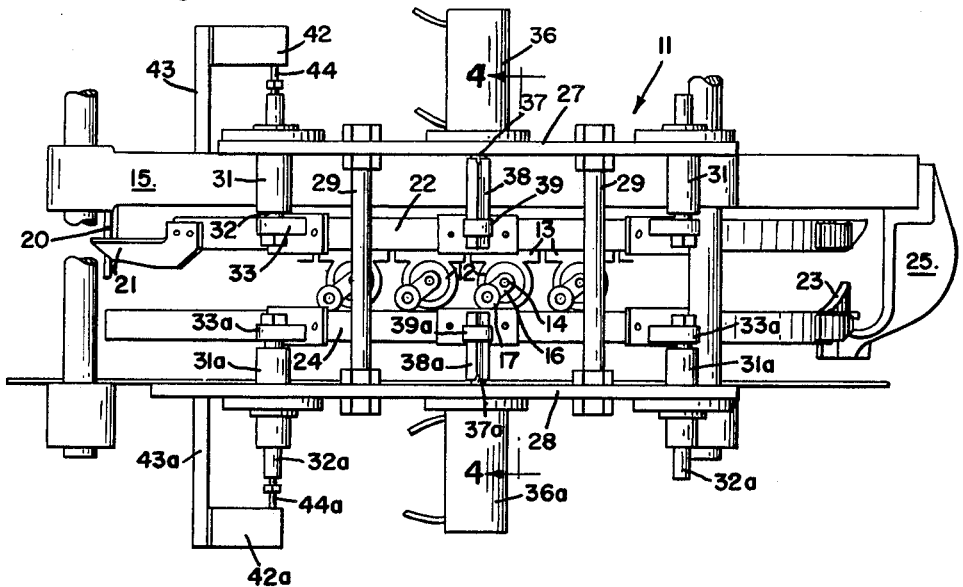
FIG. 1 is a side elevation of a portion of a filling machine with the present invention incorporated therein, showing the position of the parts during normal running operation.
Figure 2:
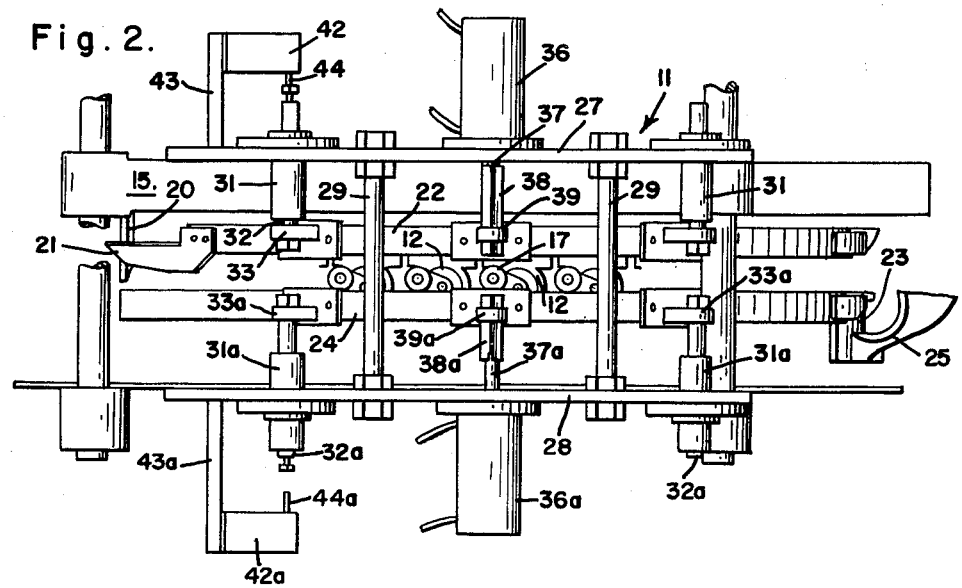
FIG. 2 is a view similar to FIG. 1, showing the lower valve cam actuating bar raised to close the valves.

A container filling machine 11 is large and complicated and has numerous parts. There are a number of such machines commercially available, with which the present invention may be employed. The machine herein illustrated is a Pfaudler glass-jar filling machine Model No. RP–21, it being understood that the invention may be used with other machines and models. Further, because the present invention is in the nature of auxiliary equipment on such machine, and since those skilled in the container filling machine art are well aware of the details of construction thereof, it is deemed unnecessary to illustrate many of the parts of the machine or to describe the same. For present purposes it may be assumed that there are a plurality of valves 12 corresponding in number to the pockets of the revolving turret 13 of the machine, each valve 12 having a horizontally disposed actuating stem 14 extending radially outwardly and carrying out its outer end an oscillatory valve actuating crank 16 having a cam roller 17 at its outer end. The valves 12 rotate as the machine operates and in normal operation the speed of rotation of the valves is substantially constant. When a cam roller 17 is in down position, as illustrated in FIG. 1, its valve 12 is full open and permits discharge of the product from the filler bowl (not shown) into the container (not shown) carried in the pocket of the turret with which the valve is aligned. When cam roller 17 is turned in clockwise direction about 90° to the position shown in FIG. 2, its valve is closed, cutting off discharge of the product to the container in the pocket. In normal operation the turret 13 as it revolves causes each valve cam roller 17 in turn as it passes the stationary valve opening cam 20 fixed to frame 15 to be turned counter-clockwise to "open" position. The valve 12 is maintained in such position as the cam roller 17 travels around running on the substantially horizontal arcuate lower valve cam rail 24. The leading edge of rail 22 is provided with a tapered leading continuation 21 to eliminate the possibility of jamming follower rolls 17 if they should be slightly higher than normal. At the end of a predetermined angular travel which corresponds to the length of time necessary to fill the container, the cam roller contacts closing cam 23 on bracket 25 fixed to frame 15 which turns the valve stem clockwise to "close" position. The valve 12 is then maintained closed for the remainder of the travel of the turret until in the next cycle of the machine it again encounters opening cam 20.

Figure 3:
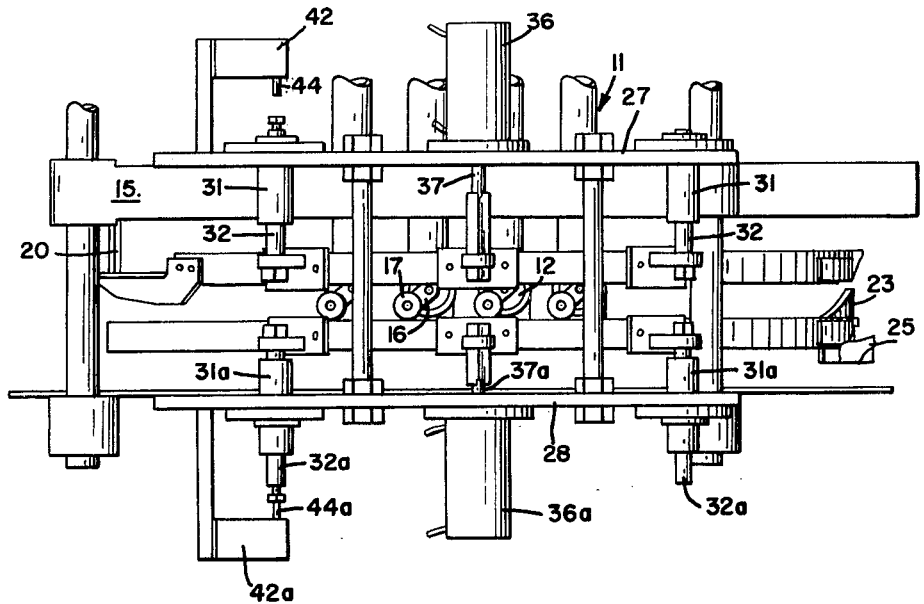
FIG. 3 is a view similar to FIG. 1 showing the upper valve cam actuating bar lowered to open the valves.

In accordance with the present invention, the rails 22, 24 are caused to move individually in a vertical sense. Thus, when the machine is stopped for any reason the lower rail 24 on which rollers 17 are riding is raised from the position shown in FIG. 1 to the position shown in FIG. 2, thereby rotating to "close" position the stems 14 of all valves then located between cams 20 and 23. This prevents discharge of product while the machine is stopped. When the machine is again started, upper rail 22 is moved downwardly, thereby turning all valve stems of valves which had been closed by movement of lower rail 24 to "open" position (shown in FIG. 3) and causing the product to again be discharged into the containers. This movement of the rail 22, 24 insures that despite stopping of the machine the containers will not be overfilled.

The means whereby the upper and lower rails 22, 24 are moved are pneumatic and are electrically controlled by the electrical circuit which controls the stopping, starting and jogging of the filling machine. There are provided stationary upper base plate 27 and lower base plate 28, each of which is horizontally disposed mounted on the machine and spaced apart a predetermined distance by base plate spacers 29. Upper base plate 27 carries guides 31 in which slide vertically reciprocal guide rods 32 fixed to rail 22 by brackets 33. Guide rods 32 maintain rail 22 in proper relationship to the base plate 27. Mounted above plate 27 is a double-acting pneumatic cylinder 36. The piston rod 37 of cylinder 36 extends through the base plate and is connected by means of extension 38 through base plate bracket 39 carried by upper cam valve rail 22. Movement of piston 41 controls the position of rail 22 relative to base plate 27. A stationary limit switch 42 is installed on the machine by bracket 43 having its switch arm 44 positioned to be contacted by rod 32 only when rail 22 is in full "up" position.

A mechanism for raising the bottom valve cam rail 24 is similar to the mechanism for lowering the upper cam rail 22. Corresponding elements of the lower cam rail are designated with the same reference numerals as for the upper cam rail, followed by the subscript $a$.

Directing attention to FIGS. 4 and 5, the electrical controls for the pneumatic system are illustrated in three-phase circuitry.

When the filler is operating normally, solenoid valves AV–1 and AV–2 maintain air pressure in cylinders 36 and 36a to hold the upper and the lower valve cam rails 22 and 24 in running position. Each valve cam roller 17 is moved to open position by cam 20 as it reaches that cam in its cycle of rotation, and after the container is filled the cam roller 17 is turned to the closed position upon contact with cam 23.

When the filler must be stopped, the operator pushes the stop button to de-energize the magnetic starter and timer 6–TS, this closes contacts ST–2 and energizes timer 3–TS. Contacts 6–TS time out and open. Contacts 3–TS are closed for a timed interval, setting up a holding circuit to energize timer 4–TS. After a timed interval, to allow the filler to stop, contacts 4–TS close, thereby energizing the solenoid of air valve AV–2, and the lower valve rail 24 rises to close the filler valves 12. As the lower valve rail 24 leaves run position, limit switch 42a is opened to interrupt the filler starting circuit. Timer 3–TS times out, thereby opening contacts 3–TS and de-energizing timer 4–TS. Contacts 4–TS open and the solenoid air valve AV–2 returns the lower valve cam bar 24 to "run" position. As the lower valve rail 24 returns to run position, limit switch 42a is closed, setting up the motor starting circuit.

After the condition causing the line to be stopped has been remedied, the operator pushes start button 53 which momentarily energizes timers 1–TS and 2–TS. Contacts 1–TS–1 open for a timed interval. Contacts 1–TS–2 close for a timed interval. Contacts 2–TS–1 close for a timed interval, energizing solenoid valve AV–1 and upper valve rail 22 opens the valves 12 by reason of piston 41a lowering, thereby moving rail 22 downward. Contacts 2–TS–2 open for a timed interval. Limit switch 42 opens as the valve rail 22 leaves run position. Contacts 2–TS time out and open, solenoid valve AV–1 is de-energized and upper valve rail 22 returns to "run" position. Limit switch 42 closes as the valve rail reaches run position. Contacts 1–TS–1 time out and close, thereby starting the filler. Contacts 1–TS–2 time out and open to set up the stop circuit. Contacts 2–TS–2 time out and close to set up the valve closing circuit.

If it is desired to jog the machine, whereby the upper valve rail 22 opens the valves 12 and returns to run position, the operator moves the selector switch 56 from "run" to "jog" position. Timer 5–TS and relay 1–RS are de-energized and auxiliary contacts 5–TSX–1 immediately open, contacts 1–TSX–2 immediately close and contacts 1–RS–1 open and contacts 1–RS–2 close. Timers 1–TS and 2–TS are energized through contacts 5–TS–1. Contacts 2–TS energize solenoid valve AV–1 and lower cam valve rail 24 opens the valves 12. Limit switch 42a opens as the valve rail leaves run position. Contacts 5–TS–1 are timed out and opened to de-energize timer 2–TS. Contacts 2–TS time out and open, de-energizing solenoid valve AV–1 and lower cam valve rail 24 is returned to run position. Limit switch LS–1 closes when the valve rail returns to run position. Contacts 5–TS–2 are timed out and closed, setting up the jog circuit.

If it is desired to operate the filler with valves closed on run or jog, the operator changes switch SC to "valves closed" position. When switch SC is in "on" position, rails 22 and 24 will open and close the valves upon stopping or starting the filler. If switch SC is in "off" position, no rail movement occurs when the filler is stopped and started.

What is claimed:

1. In a filling machine wherein is provided a rotating turret having a plurality of valves carried thereby, a cam follower for each said valve and means for opening and closing said valve responsive to movement of said cam follower, the improvement which comprises, an upper valve actuator rail, first mounting means mounting said upper valve actuator rail parallel to a portion of the path of movement of said cam followers, an upper cam cooperable with each said cam follower to move said cam follower in a first direction to operate a valve, a lower valve actuator rail, second mounting means mounting said lower valve actuator rail parallel to said portion of the path of movement of said cam followers, a lower cam cooperable with each said cam follower to move said cam follower in a second direction opposite said first direction to operate a valve, and means for moving said upper valve actuator rail toward said lower valve actuator rail to move all cam followers in said portion of the path of movement in said first direction.

2. The improvement of claim 1 which further comprises means for reversing said last-mentioned means after said upper valve actuator rail has completed its full movement toward said lower valve actuator rail.

3. The improvement of claim 1 in which said last-mentioned means comprises a fluid cylinder, a piston in said cylinder connected to said upper valve actuator rail, a source of supply of fluid under pressure, and a fluid valve controlling delivery of fluid to said cylinder.

4. The improvement of claim 3 which further comprises driving means for rotating said filling machine valves and means responsive to operation of said driving means for operating said fluid valve.

5. In a filling machine wherein is provided a rotating turret having a plurality of valves carried thereby, a cam follower for each said valve and means for opening and closing said valve responsive to movement of said cam follower, the improvement which comprises, an upper valve actuator rail, first mounting means mounting said upper valve actuator rail parallel to a portion of the path of movement of said cam followers, an upper cam cooperable with each said cam follower to move said cam follower in a first direction to operate a valve, a lower valve actuator rail, second mounting means mounting said lower valve actuator rail parallel to said portion of the path of movement of said cam followers, a lower cam cooperable with each said cam follower to move said cam follower in a second direction opposite said first direction to operate a valve, and means for moving said lower valve actuator rail toward said upper valve actuator rail to move all said cam followers in said portion of the path of movement in said second direction.

6. In a filling machine wherein is provided a rotating turret having a plurality of valves carried thereby, a cam follower for each said valve and means for opening and closing said valve responsive to movement of said cam follower, the improvement which comprises, an upper valve actuator rail, first mounting means mounting said upper valve actuator rail parallel to a portion of the path of movement of said cam followers, an upper cam cooperable with each said cam follower to move said cam follower in a first direction to operate a valve, a lower valve actuator rail, second mounting means mounting said lower valve actuator rail parallel to said portion of the path of movement of said cam followers, a lower cam cooperable with each said cam follower to move said cam follower in a second direction opposite said first direction to operate a valve, first rail moving means for moving said upper valve actuator rail toward said lower valve actuator rail to move all cam followers in said portion of the path of movement in said first direction and second actuator rail moving means for moving said lower valve actuator rail toward said upper valve actuator rail to move all cam followers in said portion of the path of movement in said second direction.

7. A filling machine comprising a turret, driving means for said turret, a plurality of filling valves carried by said turret, a cam follower for each said filling valve controlling opening and closing of said valve, a valve actuator rail positioned along a portion of the path of travel of said cam followers for simultaneously actuating every valve having a follower within said portion of the path of travel of said cam followers, mounting means for said valve actuator rail, rail actuating means associated with said mounting means for moving said valve actuator rail from a first position to a second position, said rail being normally in said first position when said driving means is operating, said rail when in said second position moving all said cam followers in said portion of the path of travel to change the position of the valves controlled by said cam followers.

8. A machine according to claim 7 which further comprises control means for said rail actuating means responsive to operation of said driving means.

9. A machine according to claim 7 in which said rail actuating means comprises a fluid cylinder having a piston connected to said rail, a source of fluid under pressure, and a fluid valve controlling delivery of fluid to said cylinder.

10. A machine according to claim 9 which further comprises control means connected to said fluid valve, said control means being responsive to operation of said driving means.

11. A machine according to claim 10 in which said control means upon stopping of said driving means first operates said fluid valve to move said rail to second position and upon completion of movement of said rail to second position returns said rail to first position.

12. A machine according to claim 10 in which said control means upon starting of said driving means first operates said fluid valve to move said rail to second position and upon completion of movement of said rail to second position returns said rail to first position.

References Cited by the Examiner
UNITED STATES PATENTS

| | | | |
|---|---|---|---|
| 956,286 | 4/10 | Champ | 141—149 XR |
| 1,254,190 | 1/18 | Baker | 141—152 XR |

LAVERNE D. GEIGER, *Primary Examiner.*

LOUIS J. DEMBO, *Examiner.*